(12) United States Patent
Wang et al.

(10) Patent No.: US 9,574,754 B2
(45) Date of Patent: Feb. 21, 2017

(54) MODULAR ILLUSTRATION LAMP

(75) Inventors: Jian Wang, Shanghai (CN); Cuijuan Zhou, Shanghai (CN); Yong Zhao, Shanghai (CN)

(73) Assignee: GE LIGHTING SOLUTIONS LLC, East Cleveland, OH (US)

( * ) Notice: Subject to any disclaimer, the term of this patent is extended or adjusted under 35 U.S.C. 154(b) by 573 days.

(21) Appl. No.: 13/882,287

(22) PCT Filed: Oct. 21, 2011

(86) PCT No.: PCT/US2011/057194
§ 371 (c)(1),
(2), (4) Date: Apr. 29, 2013

(87) PCT Pub. No.: WO2012/058101
PCT Pub. Date: May 3, 2012

(65) Prior Publication Data
US 2013/0215606 A1    Aug. 22, 2013

(30) Foreign Application Priority Data

Oct. 29, 2010    (CN) ...................... 2010 2 0599022 U

(51) Int. Cl.
*F21V 21/00* (2006.01)
*F21S 8/08* (2006.01)
(Continued)

(52) U.S. Cl.
CPC ................ *F21V 21/00* (2013.01); *F21L 4/00* (2013.01); *F21S 8/086* (2013.01);
(Continued)

(58) Field of Classification Search
CPC ....... H01L 25/10; H05K 7/20963; F16M 1/00; F21L 4/00; F21S 2/005; F21S 4/003;F21S 6/00; F21S 8/00; F21S 8/086; F21S 8/003; F21S 9/02; F21S 9/00; F21V 19/001; F21V 29/004; F21V 29/74; F21V 29/76; F21V 15/01; F21V 17/10; F21V 21/025; F21V 23/008; F21V 29/2212; F21V 7/0025; F21W 2131/103
(Continued)

(56) References Cited

U.S. PATENT DOCUMENTS 6,474,852 B1    11/2002    Ohkohdo et al.
6,536,924 B2 *    3/2003    Segretto .................. F21S 2/005
                                                                    362/247

(Continued)

FOREIGN PATENT DOCUMENTS

CN    201277472    7/2009
CN    201401648    2/2010
(Continued)

OTHER PUBLICATIONS

Philippine office action issued in connection with PL Application No. 1-2013-500643 dated Jun. 6, 2014.
(Continued)

*Primary Examiner* — Hargobind S Sawhney
(74) *Attorney, Agent, or Firm* — GE Global Patent Operation; Peter T. DiMauro

(57) ABSTRACT

A modular illumination lamp comprises a base, wherein the lamp further comprises: a first frame integrally formed with the base; a second frame connected to the first frame or the base; at least one illumination module mounted on the first and second frames. By the specific design of the modular illumination lamp, the amount of the illumination modules can be increased or decreased as desired.

12 Claims, 5 Drawing Sheets

(51) Int. Cl.
*F21L 4/00* (2006.01)
*F21W 131/103* (2006.01)
*F21Y 101/00* (2016.01)

(52) U.S. Cl.
CPC .... *F21W 2131/103* (2013.01); *F21Y 2101/00* (2013.01); *Y02B 20/72* (2013.01)

(58) Field of Classification Search
USPC .................................. 362/217.01, 220–225, 217.11–217.17,362/227, 236–238, 240, 244, 245, 249.01,362/249.02, 285, 326, 327, 328, 410, 414, 800
See application file for complete search history.

(56) References Cited

U.S. PATENT DOCUMENTS

| | | | |
|---|---|---|---|
| 6,659,622 B2 | 12/2003 | Katogi | |
| 8,092,049 B2 * | 1/2012 | Kinnune et al. | 362/294 |
| 2006/0248761 A1 * | 11/2006 | Cheung | G09F 13/04 40/564 |
| 2008/0080196 A1 | 4/2008 | Ruud et al. | |
| 2009/0268477 A1 * | 10/2009 | Zheng et al. | 362/373 |
| 2009/0316404 A1 | 12/2009 | Mo et al. | |
| 2010/0073932 A1 | 3/2010 | Zheng | |
| 2010/0149809 A1 * | 6/2010 | Ruud et al. | 362/249.02 |
| 2010/0246179 A1 | 9/2010 | Long et al. | |

FOREIGN PATENT DOCUMENTS

| | | |
|---|---|---|
| CN | 201428997 | 3/2010 |
| CN | 201764321 | 3/2011 |
| CN | 102062339 | 5/2011 |
| CN | 201902936 | 7/2011 |
| EP | 2327930 A1 | 6/2011 |
| JP | 2001118408 A | 4/2001 |
| JP | 2002163907 A | 6/2002 |
| JP | 3163564 U | 10/2010 |
| KR | 2009-0040261 A | 4/2009 |
| KR | 2009-0124643 A | 12/2009 |
| KR | 2010-0026422 A | 3/2010 |
| KR | 101049711 B1 | 7/2011 |
| WO | 2011028773 A1 | 3/2011 |

OTHER PUBLICATIONS

International Search Report dated Apr. 19, 2012 which has been issued in connection with the PCT Application No. US11/57194 which was filed on Oct. 21, 2011.
Unofficial Engilsh translation of Korean Office Action dated May 27, 2013 from corresponding KR Application No. 2013-7009548.
Unofficial English Translation of Japanese Office Action issued in connection with corresponding JP Application No. 2013-536679 on Jun. 5, 2015.
Unofficial English Translation of Japanese Office Action issued in connection with corresponding JP Application No. 2013536679 on Mar. 8, 2016.

* cited by examiner

MODULAR ILLUSTRATION LAMP

CROSS-REFERENCE TO RELATED APPLICATIONS

This is a national stage application under 35 U.S.C. §371(c), PCT application number PCT/US11/57194 filed on Oct. 21, 2011, which respectively claims priority to Chinese application 201020599022.1 filed on Oct. 29, 2010, the disclosures of which are hereby incorporated in their entirety by reference herein.

TECHNICAL FIELD

An embodiment of the present invention relates to a lamp, in particularly, to a modular light-emitting diode (LED) lamp with the number of its modules being able to be increased or decreased as desired.

BACKGROUND

Currently, there has been a trend of using LED light sources to replace other kinds of light sources for energy saving. LED lamps are generally similar to traditional lamps in some aspects, and usually, the size of the LED lamp is fixed, and the power of the lamp can be adjusted by varying the amount of the LEDs. It is uneconomical to use a large lamp housing where small power is required.

Currently available modular LED lamps usually each have a detachable frame mounted on the base of the lamp. Frames with different lengths may be selected in accordance with the amount of LED illumination modules needed. However, such a lamp with a detachable frame is generally less aesthetic in appearance than those with a frame integral with the lamp base, since the detachable frame is normally made by extrusion, and is of poor flexibility.

BRIEF DESCRIPTION

The technical problem to be solved by the disclosed technology is to overcome the drawbacks in the related technical field that the frame and base of the lamp can hardly be integrally formed and the lamp has poor flexibility. Hence, an embodiment of the present invention discloses a new modular illumination lamp.

To solve the above problem, an embodiment of the present invention provides a modular illumination lamp comprises a base, wherein the lamp further comprises: a first frame integrally formed with the base; a second frame connected to the first frame or the base; at least one illumination module mounted on the first and second frames.

By the specific design of the first and second frames, the amount of the illumination modules can be increased or decreased as desired.

As the first frame is formed integrally with the base of the lamp, the technical solution of the embodiments of the present invention ensures an aesthetic appearance of the lamp in its normal use state and the flexibility of the product. The second frame may be added under special requirements to lengthen the lamp structure, so as to achieve a good effect in use.

BRIEF DESCRIPTION OF THE DRAWINGS

The contents, advantages of embodiments of the present invention would be more apparent with reference to the accompany drawings of the illustrative embodiments of the invention.

DETAILED DESCRIPTION

Figure 1:
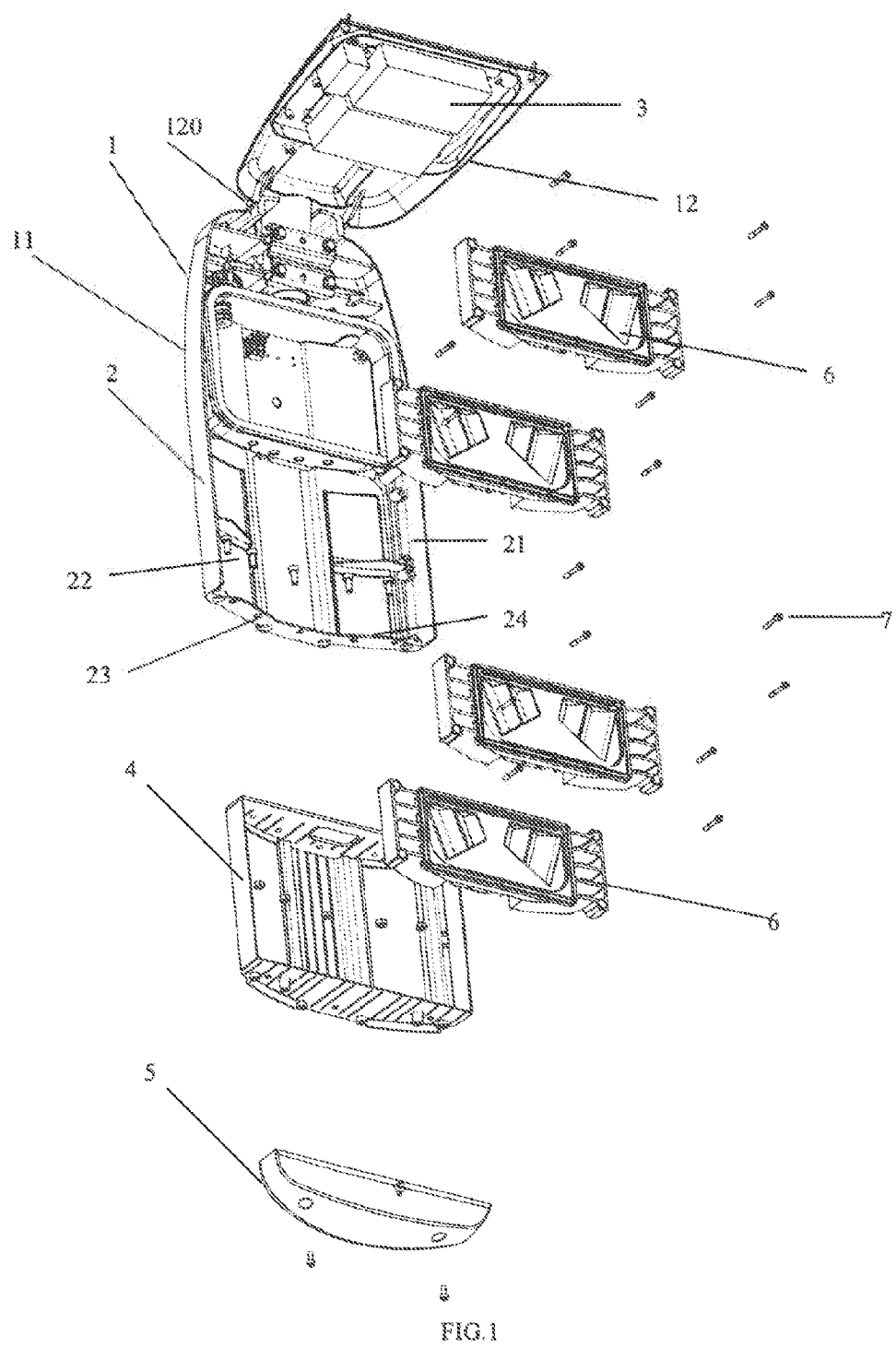
FIG. 1 shows a structural exploded view of a modular illumination lamp of an embodiment of the invention.

An embodiment of the invention is shown in FIG. 1-8, wherein FIG. 1 shows a structural exploded view of a modular LED lamp, and said lamp comprises a base 1, a first frame 2, a power source case 3, a second frame 4, an end cap 5, and LED light source module(s) 6.

The base 1 comprises an upper housing 11 and a lower housing 12. The power source 3 is mounted in a space formed between the upper and lower housings. The lower housing 12 comprises a pivot shaft 120 on its rear side, which is mounted within respective hole or holes (not shown) on the rear side of the upper housing, such that the lower housing 12 can be pivotally mounted on the upper housing 11, and are fixed together with the upper housing 11 by a fixing means on the front of the lower housing 12. The power source case 3 mounted within the space formed between the upper and lower housing performs a conversion from alternating current (AC) to direct current (DC), i.e., converts alternating electric current AC to direct current.

The front portion of the base 1 further comprises a first frame 2, which is formed integral with the base 1 by casting so as to meet different requirements of the users and the forming of the different appearance. The first frame 2 comprises a support rod extending forwardly from the base 1, a cross beam 24, and a space 22 running through in the up-down direction. The support bar 21 and the cross beam 24 are respectively provided with threaded holes 23. The inside of the first frame 1 forms a receiving space for receiving the LED light source module(s) 6. A bolt 7 mates with each of the threaded holes in the support bar 21, so as to fit the LED light source 6 onto the first frame 2.

The length of the first frame 2 can be adjusted as desired. The present embodiment shows an arrangement with two LED modules, which is the one of the familiar arrangements in use. A section of the first frame 2 can be removed away when only one LED module is mounted.

Figure 2:
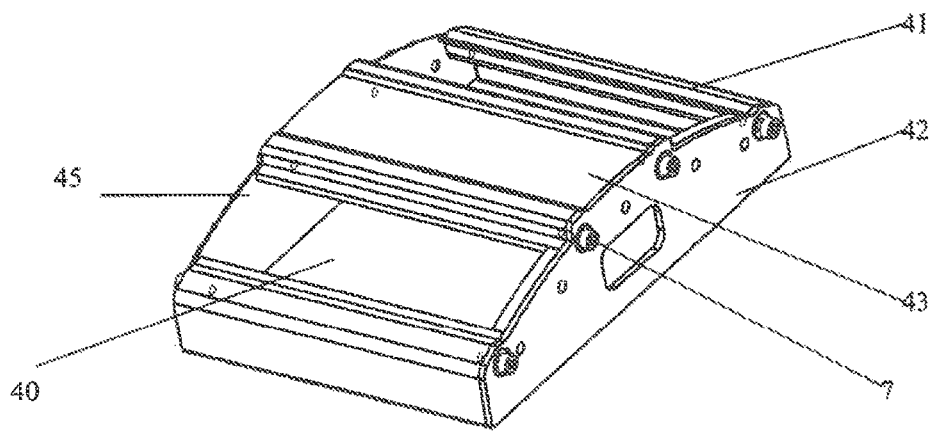
FIG. 2 shows a structural view of a telescopic extrusion member of the modular illumination lamp of an embodiment of the invention.
Figure 3:
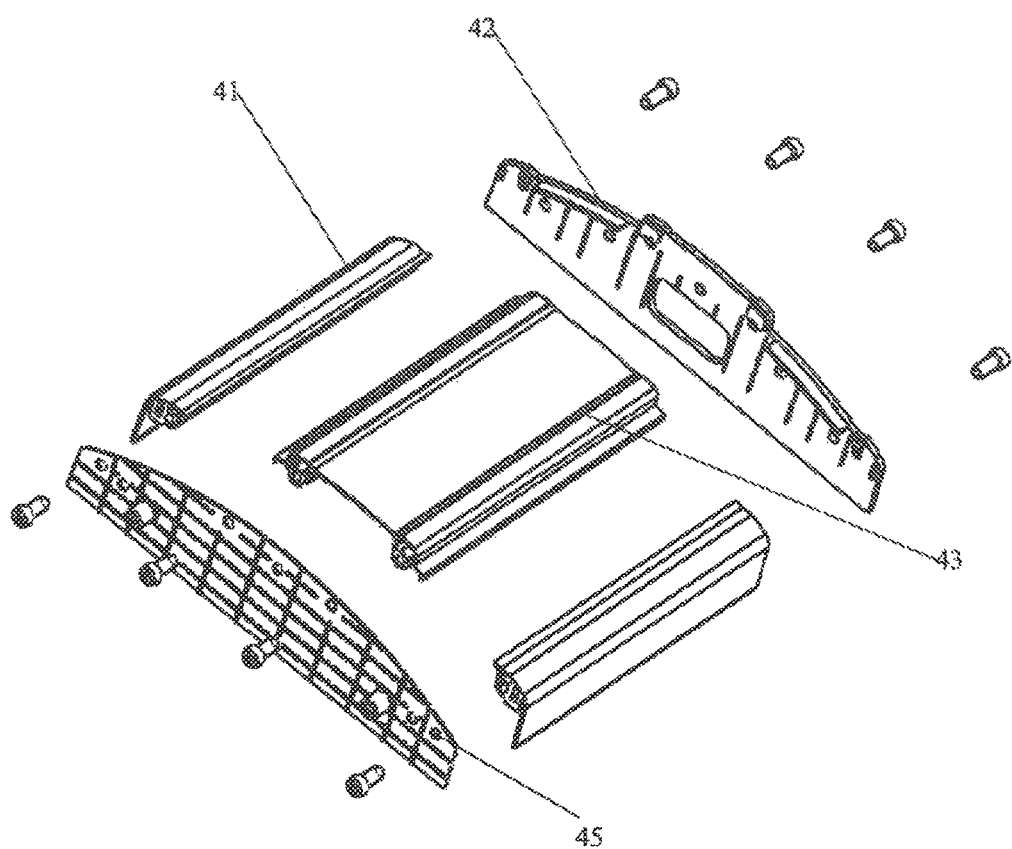
FIG. 3 shows a structural exploded view of the telescopic extrusion member of the modular illumination lamp of an embodiment of the invention.
Figure 4:
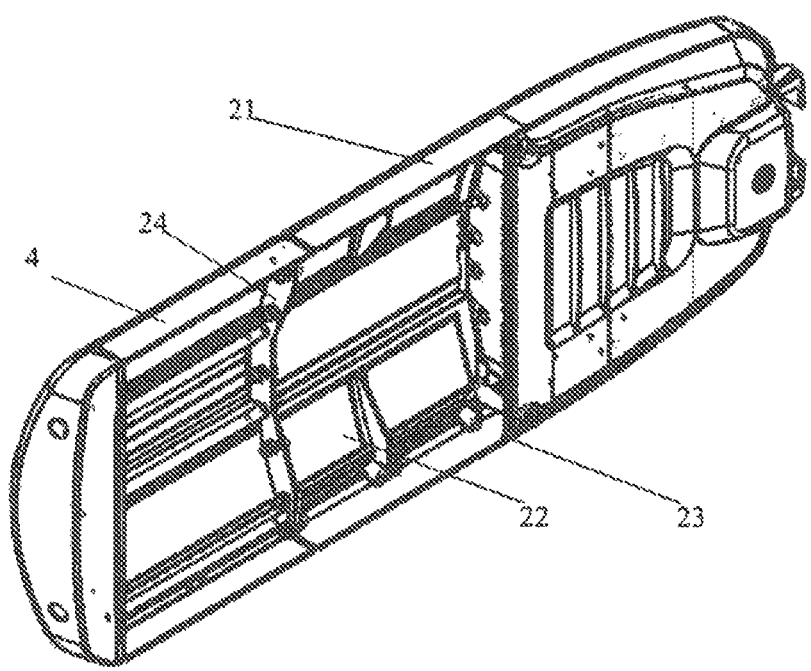
FIG. 4 shows a frame view of a telescopic lamp housing of the modular illumination lamp of an embodiment of the invention.

With Reference to FIGS. 2-4, the second frame 4 is mounted on a side of the first frame. The second frame 4 comprises the support bars 41, which are extrusion members or stamping members, extending along an axis direction of the lamp, and a top face thereof is connected to cross beams 42 and 45 by self tapping screws 7. The cross beams 42, 45 and the support bar 41, the top face 43 together form a through space 40. The amount of the mounted optical modules is changed with the requirement of the lamp power, and thus the lengths of the support bar 41 and the top face 43 are also changed.

Figure 5:
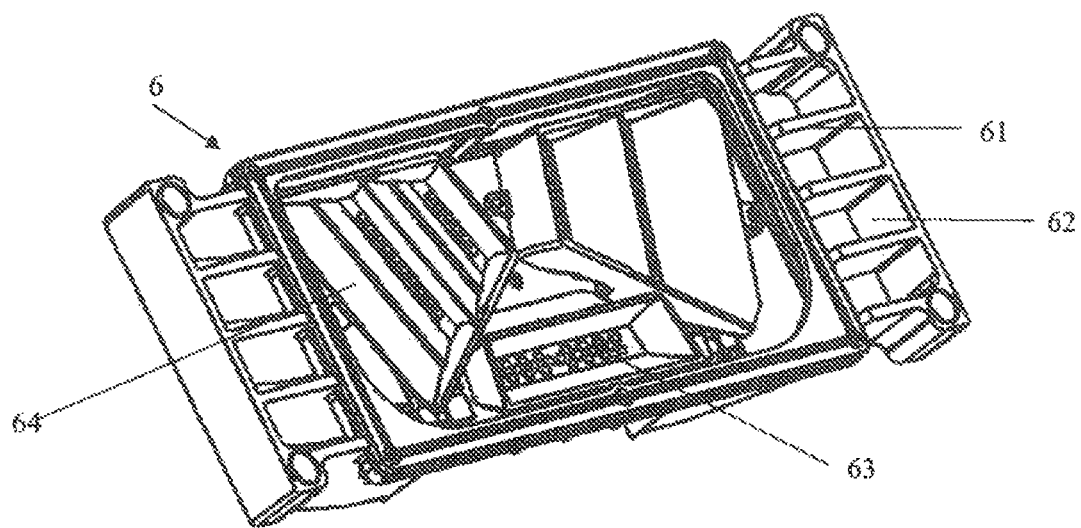
FIG. 5 shows an elevation view of a light source module of the modular illumination lamp of an embodiment of the invention.
Figure 6:
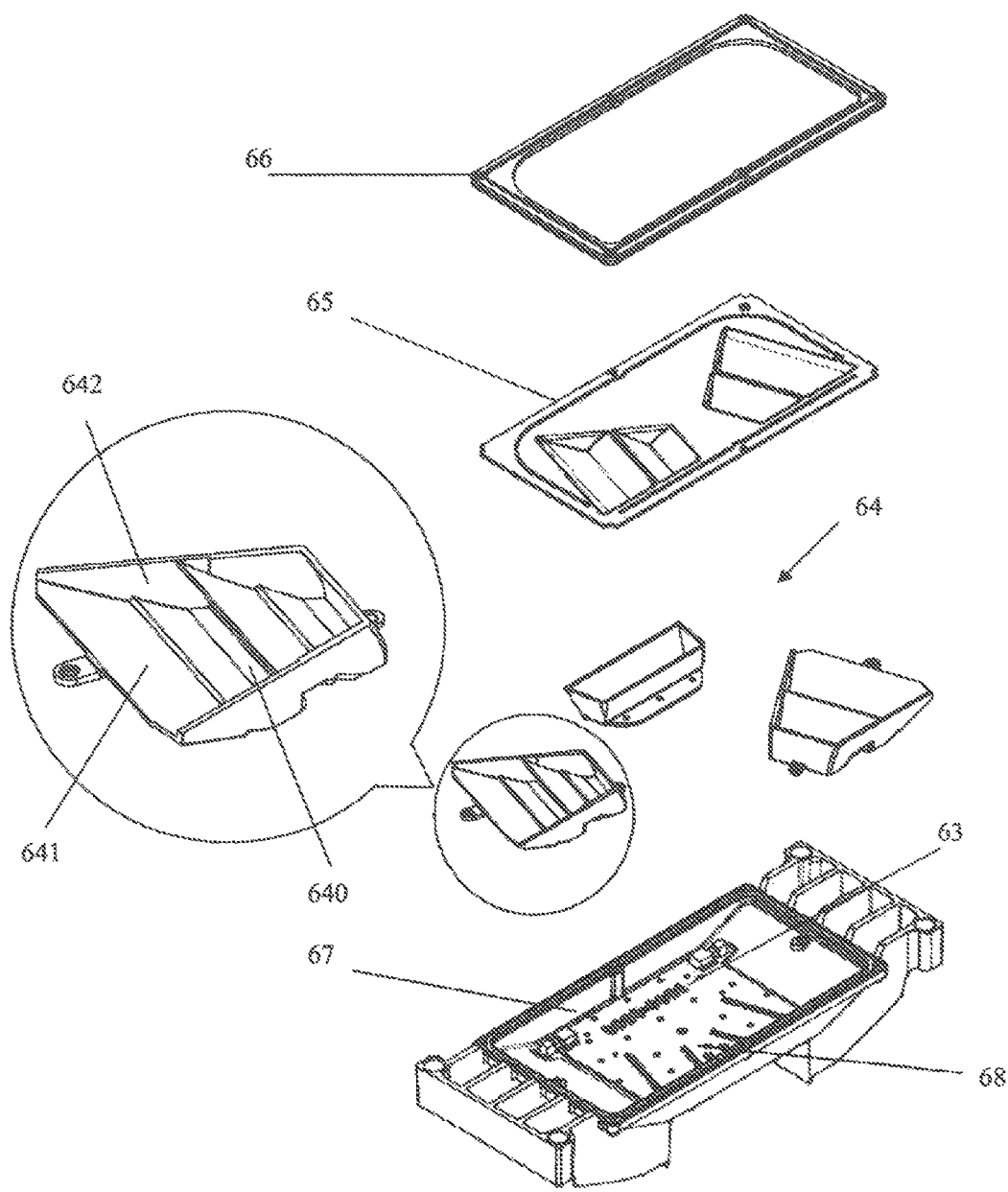
FIG. 6 shows an exploded view of the light source module of the modular illumination lamp of an embodiment of the invention.
Figure 7:
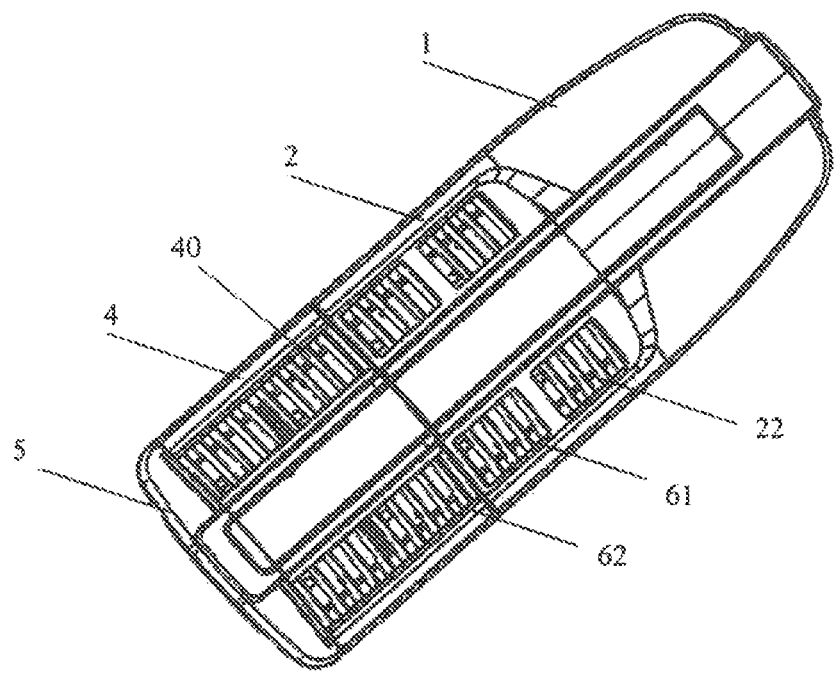
FIG. 7 shows an elevation assembly view of the light source module of the modular illumination lamp of an embodiment of the invention.
Figure 8:
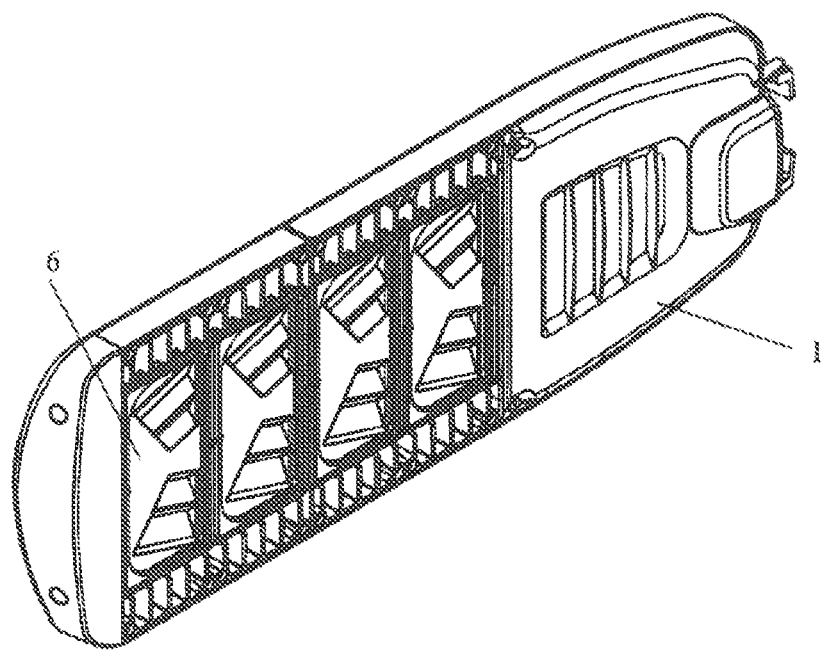
FIG. 8 shows an elevation assembly view of the light source module of the modular illumination lamp of an embodiment of the invention from another angle of view.

With reference to FIGS. 5-6, the LED module 6 comprises a radiator, the center of which forms a receiving portion 67 inside, and is provided with a DC-DC circuit (not shown) on its back. There is a circuit board 68 inside the receiving portion 67. A LED light source 63 is mounted on the circuit board 68. Heat dispersion ridges 61 extend from the back of the receiving portion 67 to the two sides of the receiving portion, and extend from the radiator vertically and upwardly. Through holes 62 are formed between heat dispersion ridges 61 so as to facilitate the dispersion of heat. As shown in FIGS. 7 and 8, when the LED module 6 are mounted on the first frame 2 and the second frame 4, at least a portion of the heat dispersion ridges 61 and the through holes 62 are disposed just below the through space 22 and 40, so as to facilitate the heat dispersion of the vertically extending heat dispersion ridges 61 and prevent accumulation of dirt and debris on the lamp.

A reflector 64 comprises two side portions 642 and a reflecting portion 641 connecting the two side portions 642 and forms a sector structure, and a receiving space is formed between the side portions 642 and reflector 641 and corresponds to the LED light sources 63. In the present embodiment, each LED module 6 comprises three reflectors 64, each corresponding to the LED light source 63 on the circuit board 68 respectively. When the LED module 6 is mounted on the circuit board 68, the LED light source 63 is located in the receiving space 640. The light source 63 emits light onto the reflector 64, and the light reflected from the reflector 64 is emitted to outside through lens 65. There is also a portion of the light emitted directly to outside without being reflected. The present embodiment adapts design of a sector shape reflector 64 adjacent to each LED light source 63, so as to achieve good optical effect. A press plate 66 fixes the lens 65 and reflector 64 on the LED module 6.

An end cap 5 is mounted on a side of the second frame 4. The end cap 5 may also be directly mounted on a side of the first frame 2, as the fixation structure is common to both the second frame 4 and the first frame 2. Therefore, a complete lamp is constructed. That is to say, the end cap 5 may connected to the first frame 2 or the base, and is same with the fixation means on the second frame 4 in structure.

The lamp of an embodiment of the present invention may use an arrangement with a base and a first frame integral with the base instead of the arrangement with an end cap; the lamp further comprises a second frame mounted to be connected with the first frame or the base.

As the first frame 2 is formed integral with the base 1 of the lamp, an embodiment of the present invention ensures an aesthetic appearance of the lamp in its normal use state and the flexibility of the product. The second frame may be added under special requirements to lengthen the lamp structure, so as to achieve a good effect in use.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A modular illumination lamp comprising:
    a base, wherein the base comprises at least a chamber, and at least a power source is mounted within the chamber;
    a first frame integrally formed with the base by casting;
    a second frame connected to the first frame or the base; and
    at least one illumination module mounted on the first frame and at least one illumination module mounted on the second frame;
    wherein the at least one illumination module is a LED illumination module, and comprises a plurality of LED light sources, and a sector reflector is disposed on a side of the plurality of LED light sources; wherein the sector reflector comprises two side portions and a reflecting portion connecting the two side portions and forms a sector structure, and a receiving space is formed between the two side portions and reflector, and the plurality of LED light sources are disposed in said receiving space.

2. The modular illumination lamp as claimed in claim 1, wherein the first frame is formed to extend forwardly from the base.

3. The modular illumination lamp as claimed in claim 2, wherein the lamp comprises an end cap mounted on a side of the second frame.

4. The modular illumination lamp as claimed in claim 3, wherein the second frame comprises at least a support bar comprising an extrusion member extending along the axial direction of the lamp.

5. The modular illumination lamp as claimed in claim 4, wherein the second frame comprises a fixing sheet further fixed with the first frame.

6. The modular illumination lamp as claimed in claim 1, wherein the lamp comprises an end cap mounted on a side of the second frame.

7. The modular illumination lamp as claimed in claim 6, wherein the second frame comprises at least a support bar comprising an extrusion member extending along the axial direction of the lamp.

8. The modular illumination lamp as claimed in claim 7, wherein the second frame comprises a fixing sheet further fixed with the first frame.

9. The modular illumination lamp as claimed in claim 1, wherein the power source in the base comprises an AC-DC module, and a DC-DC module may be provided on the illumination module.

10. The modular illumination lamp as claimed in claim 1, wherein the at least one illumination module is a LED illumination module, and comprises a plurality rows of LED light sources, and a sector reflector is disposed on a side of the rows of LED light sources.

11. A modular illumination lamp comprising:
    a base, wherein the base comprises at least a chamber, and at least a power source is mounted within the chamber;
    a first frame integrally formed with the base by casting;
    a second frame connected to the first frame or the base; and
    at least one illumination module mounted on the first frame and at least one illumination module mounted on the second frame;
    wherein the at least one illumination module is a light emitting diode (LED) illumination module, and the illumination module further comprises a plurality of heat dispersion fins, which are vertically arranged with intervals therebetween, the first and second frames are provided with through holes correspondingly, and the heat dispersion fins are disposed below the through holes, and communicate with the space above the lamp.

12. A modular illumination lamp comprising:

a base, wherein the base comprises at least a chamber, and at least a power source is mounted within the chamber;

a first frame integrally formed with the base by casting;

a second frame connected to the first frame or the base; and at least one illumination module mounted on the first frame and at least one illumination module mounted on the second frame;

wherein at least one illumination module further comprises a plurality of heat dispersion fins, the first and second frames are provided with spaces, and the heat dispersion fins are disposed below the spaces.

* * * * *